United States Patent [19]

Yanagisawa

[11] Patent Number: 4,679,829

[45] Date of Patent: Jul. 14, 1987

[54] PORTING MEMBER WITH A UNIVERSAL COUPLING MECHANISM

[75] Inventor: Masahiro Yanagisawa, Isesaki, Japan

[73] Assignee: Sanden Corporation, Gunma, Japan

[21] Appl. No.: 824,369

[22] Filed: Jan. 23, 1986

[30] Foreign Application Priority Data

Jan. 28, 1985 [JP] Japan .................... 60-9030[U]

[51] Int. Cl.[4] ........................................... F16L 41/00
[52] U.S. Cl. ................................. 285/190; 285/334.4
[58] Field of Search ........................ 285/190, 334.4

[56] References Cited

U.S. PATENT DOCUMENTS

| 3,145,035 | 8/1964 | Hanback | 285/190 X |
| 3,166,252 | 1/1965 | O'Brien et al. | 285/190 X |
| 3,219,366 | 11/1965 | Franck | 285/190 |
| 4,452,695 | 6/1984 | Schmidt | 285/190 X |

FOREIGN PATENT DOCUMENTS

| 97474 | 7/1924 | Austria | 285/190 |
| 861036 | 12/1952 | Fed. Rep. of Germany | 285/190 |
| 1064041 | 5/1954 | France | 285/190 |
| 22588 | 1/1962 | German Democratic Rep. | 285/190 |
| 22506 | 1/1962 | German Democratic Rep. | 285/190 |
| 651499 | 4/1951 | United Kingdom | 285/190 |

Primary Examiner—Thomas F. Callaghan
Attorney, Agent, or Firm—Banner, Birch, McKie & Beckett

[57] ABSTRACT

A porting member with a universal coupling mechanism comprises a connector which is fixed on a container opening and provided with a first fluid passage, and a port element which is rotatably supported on the connector and provided with a second fluid passage. The port element is clamped between opposed surfaces of the connector and the final position determined by interengagement of a spherical shaped surface and an edge ring formed on the opposed surfaces of the connector.

4 Claims, 4 Drawing Figures

PORTING MEMBER WITH A UNIVERSAL COUPLING MECHANISM

BACKGROUND OF THE INVENTION

This invention relates to a porting member with a universal coupling mechanism suitable use on a pressure container for connecting between the interior of the container and an external pressure source, and more particularly to a sealing structure for the universal coupling mechanism.

Universal coupling mechanisms are usually used in a pressure container, for example, with a receiver and dryer of a refrigerant system to easily select and then fix the position of a port which is connected with an external pipe line. Referring to FIG. 1, the basic structure of a prior art porting member having a universal coupling mechanism will be explained. The porting member with a universal coupling mechanism 1 comprises a connector 2 which is screwed into a threaded hole in a pressure container P, the connector being provided with a hollow portion 3. A coupling port 4 is rotatably fitted on an outer peripheral surface of connector 2 and provided with a radially extending port element 5. A hollow portion 7 is formed in port element 5 communicating with hollow portion 3 of connector 2 through a hole 2a formed in connector 2. Coupling port 4 is clamped between the outer surface of container P and shoulder portion 6 formed on the upper portion of connector 2.

To seal between connector 2 and coupling port 4, and between connector 2 and container P seal elements 8 and 9 are disposed on upper/lower end surfaces of coupling port 4 engaging with shoulder portion 6 of connector 2 and the outer surface of container P. Therefore, the final position of coupling port 4 is determined by securely screwing connector 2 in after fixing the position of port element 5 in accordance with the pipe arrangement to which the port element 5 is to be connected.

In this construction of a porting member, the sealing between the coupling port and connector, and between the coupling port and the container is maintained by seal elements. However, the performance of the seal elements becomes bad with aging. As the result of the aging of the seal elements, the porting member must be replaced with a new product to enable continually using the apparatus with the pressure container.

SUMMARY OF THE INVENTION

It is a primary object of this invention to provide an improved porting member with a universal coupling mechanism which ensures favorable sealing between the contact portion of the parts without change due to aging.

It is another object of this invention to provide a porting member with a universal coupling mechanism which accomplishes sealing with a simple construction which can be easily manufactured.

The porting member with a universal coupling mechanism according to this invention includes a connector means which is fixedly disposed on a container and provided with a central hollow portion and a radial hole to form a fluid passageway from the interior of the container to external equipment. A port means is rotatably supported on the connector means and provided with a connecting hollow portion to form the fluid passageway together with the central hollow portion and radial hole whereby the position of one end opening of the connecting hollow portion can be easily selected by rotation of the port means while keeping communication between the central and connecting hollow portions. The connector means has two surfaces which are opposed to one another with a gap therebetween these surfaces being contacted with the opposite side surfaces of the port means to form a sealing structure. A semispherical portion and an edge portion are formed on the side surfaces of the port means, respectively.

Further objects, features and other aspects of this invention will be understood from the detailed description of the preferred embodiments of this invention while referring to the annexed drawings.

DETAILED DESCRIPTION OF THE PREFERRED EMBODIMENTS

Figure 1:
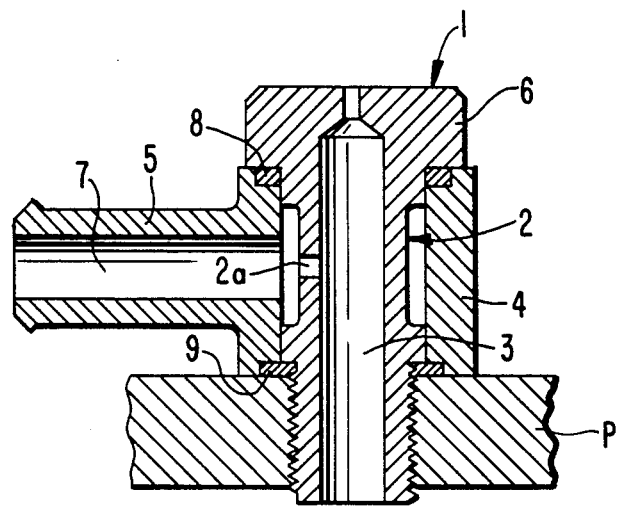
FIG. 1 is a sectional view of a prior art porting member with a universal coupling mechanism.
Figure 2:
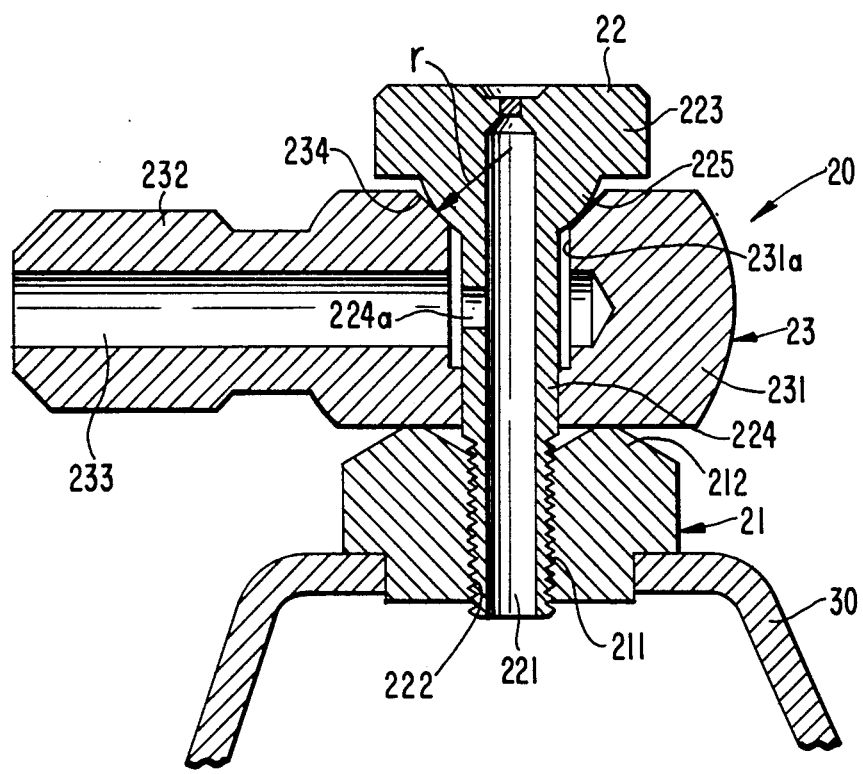
FIG. 2 is a sectional view of a porting member with a universal coupling mechanism according to one embodiment of this invention.

Referring to FIG. 2, there is shown a porting member with a universal coupling mechanism suitable for use on a pressure container to connect between the interior of the container and an external pipe arrangement in accordance with this invention. Porting member 20 comprises a support element 21 welded or brazed onto an opening of a pressure container 30. A connector 22 provided with a central hollow portion 221 opening into the interior of container 30 has a port element 23 rotatably fitted on connector 22.

Support element 21 has a threaded hole 211 in its central portion 221 formed with an edge ring 212 on its outer surface concentric with the threaded hole 211. A threaded portion 222 which is screwed into threaded hole 211 of support element 21 is formed on one end of connector 22. A collar portion 223 is formed at the other end of connector 22. Connector 22 has a connecting portion between collar portion 223 and a body element 224, this connecting portion being formed by spherical shaped surface 225 having a radius "r".

The surface hardness of edge ring 212 and that of spherical shaped surface 225 should be hardened by a suitable hardness surface treatment or appropriate quenching.

Port element 23 comprises a ring shaped body portion 231 with cavity 231a and a port portion 232 extending radially from the outer peripheral surface of body portion 231 with a hollow portion 233 in port portion 232. One end opening of hollow portion 233 faces the interior of the cavity 231a and communicates with hollow portion 221 of connector 22 through hole 224a in body element 224 of connector 22. A bevelled portion 234 is formed surrounding the opening leading to cavity 231a to form a contact surface to cooperate with spherical shaped surface 225.

Port element 23 is formed of slightly softer material than that of connector 22, for example, aluminum alloy.

In this construction of porting member 20, body portion 231 of port element 23 is clamped between connector 22 and support element 21, and finally the spherical shaped surface 225 and edge ring 212 engage upon opposite side surfaces of body portion 231 of the port element by screwing connector 22 into the support element 21. The sealing between support element 21 and port element 23, and also between connector 22 and port element 23 is thus secured by clamping engagement of the edge ring and spherical shaped surface, while the position or direction in which the port element extends becomes fixed.

As mentioned above, the sealing structure of the porting member is accomplished by contact of metallic material, therefore, the performance of sealing does not become bad with aging. Also, the spherical shaped surface of the connector functions to self align the parts to accomplish full contact with the bevelled surface portion. Therefore, manufacturing errors possible occurring in the spherical shaped surface and edge ring will be taken care of to thereby easily manufacture each part of the porting member while maintaining the sealing conditions.

Figure 3:
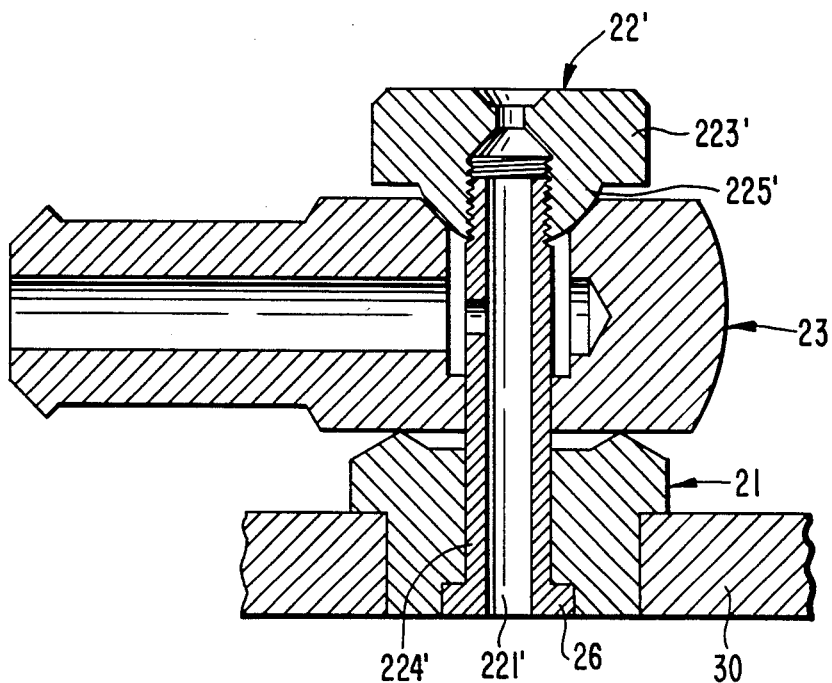
FIG. 3 is a sectional view of a porting member with a universal coupling mechanism according to another embodiment of this invention.
Figure 4:
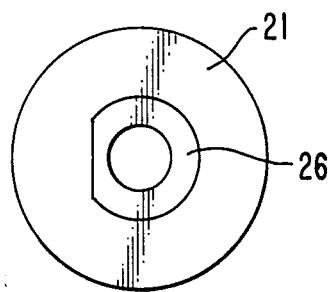
FIG. 4 is a bottom plan view of the porting member shown in FIG. 3.

Referring to FIGS. 3 and 4, another embodiment of this invention is shown which is to directly modify the construction of the hollow portion 221' and have a separately formed collar portion 223'. Collar portion 223' which has a spherical shaped surface 225' is screwed onto the outer end portion of body element 224'. Rotation of body element 224' is prevented by cutting a portion of flange 26 which is formed on the other end of element 224' and engaged with the recess formed on support element 21. Therefore, manufacturing of each part which makes up the porting member is easily performed.

This invention has been described in detail in connection with the preferred embodiments, but these embodiments are examples only and this invention is not to be considered as restricted thereto. It will be easily understood by these skilled in the art that other variations and modifications can be easily made within the scope of the invention as claimed.

I claim:

1. In a porting member with a universal coupling mechanism including a connector means fixedly mounted on a container provided with a central hollow portion and radial hole to form a fluid passageway from the interior of said container to external equipment, and a port means rotatably supported on said connector means provided with a connecting hollow portion to complete the fluid passageway together with said central hollow portion and said radial hole whereby the desired position of one end opening of said connecting hollow portion can be easily selected by rotation of said port means, the improvement comprising; said connector means having two surfaces which are opposite to one another with a gap between said surfaces, said surfaces contacting with the opposite side surfaces of said port means to form a sealing structure, a semi-spherical portion and an edge portion are formed on said surfaces of said connector means, respectively, said port means having a pair of oppositely facing surface portions, one of said surface portions having a bevelled configuration disposed to engage with said semi-spherical portion and the other of said surface portions being generally planar disposed to engage with said edge portion.

2. The porting member with a universal coupling mechanism of claim 1 wherein said connector means comprises a support element mounted on said container and a connector which is fixed on said support element, said connector having a collar element at one end, said semi-spherical portion being formed on one of said elements and said edge portion being formed on the other of said elements.

3. The porting member with a universal coupling mechanism of claim 2 wherein said edge portion is formed concentric with said connector.

4. The porting member with a universal coupling mechanism of claim 2 wherein said connector comprises a body element fixed on said support element and collar portion fixed on the outer end portion of said body element.

* * * * *